United States Patent Office 3,445,489
Patented May 20, 1969

3,445,489
9β,10α-STEROIDS, INTERMEDIATES THEREFOR
AND PHARMACEUTICAL PREPARATIONS CONTAINING THESE COMPOUNDS AS AN ACTIVE
INGREDIENT
Engbert Harmen Reerink, Pieter Westerhof, and Hendrik
Frederik Louis Scholer, Van Houtenlaan, Weesp, Netherlands, assignors, by mesne assignments, to U.S. Philips
Corporation, New York, N.Y., a corporation of
Delaware
No Drawing. Continuation of application Ser. No.
470,874, July 9, 1965. This application July 15,
1966, Ser. No. 565,671
Claims priority, application Netherlands, Apr. 12, 1958,
226,774
Int. Cl. C07c *169/66, 169/22*
U.S. Cl. 260—397.4                6 Claims

ABSTRACT OF THE DISCLOSURE

3(keto, alkoxy or acyloxy) - 6 methyl 9β, 10α steroids of the androstane series. Examples are 6α-methyl-17β-hydroxy-9β, 10α - androst - 4 - en - 3 - one 17 - acetate and 6 - methyl - 17α - ethinyl 17 - hydroxy - 9β, 10α-androsta - 4,6 - dien 3 - one. In general the compounds have anabolic activity.

---

The instant application is a continuation of application Ser. No. 470,874 filed July 9, 1965, now abandoned which is a continuation-in-part of copending application Ser. No. 343,197 filed Feb. 7, 1964, which is a division of application Ser. No. 201,824 filed June 12, 1962 and now U.S. Patent 3,198,792. Said application Ser. No. 201,824 was a continuation-in-part of application Ser. No. 805,020 filed Apr. 8, 1959 and now abandoned.

The invention relates to 9β,10α-steroids of the general formula

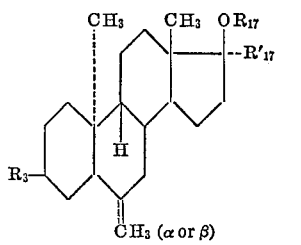

Formula A in which formula $R_3$ represents a 3 - keto - 4 - dehydro, a 3 - keto - 1,4-bisdehydro, a 3 - keto - 4,6 - bisdehydro, a 3 - keto-1,4,6 - trisdehydro, a 3 - alkoxy - 3,5 - bisdehydro or a 3 - acyloxy - 3,5 - bisdehydro - system, $OR_{17}$ represents a hydroxy group or an acycloxy or an alkoxy group, and $R'_{17}$ represents a hydrogen atom, a methyl, an ethyl, a vinyl or an ethynyl group.

Compounds of the Formula A have interesting hormonal and anti-hormonal activities. In general the compounds show anabolic or gonadotrophic influencing activities.

The hydrogen atoms or methyl groups at the carbon atoms 8, 9, 10, 13 and 14 of the compounds according to the invention have the same stereochemical configuration as the corresponding hydrogen atoms and methyl groups in dihydroisolumisterone. Castells et al. Proc. of the Chemical Society, 1958, page 7, has shown that dihydroisolumisterone has the configuration 8β,9β,10α-methyl, 13β-methyl, 14α.

The novel steroids of the invention are indicated as 9β,10α-steroids to indicate at which carbon atoms (9 and 10) the stereo-configuration deviates from the one of the normal steroids and in which sense (9β,10α in contradistinction to the 9α,10β-configuration of the normal steroids).

Thus 6α - methyl - 17β-hydroxy-9β,10α-androst-4-en-3 - one 17-acetate shows a favourable anabolic activity. The compound is also anti-catabolic. 6β-methyl-17β-hydroxy - 9β,10α - androst - 4-en-3-one 17 - acetate is gonadotrophic inhibiting and antiandrogenic.

6 - methyl - 17β - hydroxy-9β,10α-androst-4,6-dien-3-one 17 acetate has a favourable anabolic activity.

Other compounds according to the invention are the following ones:

6α(and β)-methyl-17β-hydroxy-9β,10α-androsta-1,4-dien-3-one,
6-methyl-17α-ethinyl-17-hydroxy-9β,10α-androsta-4,6-dien-3-one,
6-methyl-17β-hydroxy-9β,10α-androsta-4,6-dien-3-one,
6α(and β)-methyl-17α-ethinyl-17-hydroxy-9β,10α-androst-4-en-3-one,
6α(and β)-methyl-17α-methyl-17-hydroxy-9β,10α-androst-4-en-3-one,
6α(and β)-methyl-17α-ethyl-17-hydroxy-9β,10α-androst-4-en-3-one,
3,17β-diacetoxy-6-methyl-9β,10α-androsta-3,5-diene.

The compounds according to the invention may be produced from 9β,10α-steroids by techniques known per se.

In particular the methods of producing the new 9β,10α-steroids of the invention may be characterized in that (a) a compound of the formula

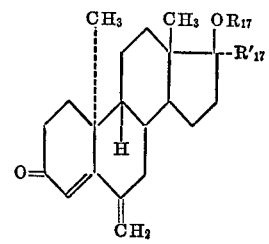

(Formula I)

in which formula $OR_{17}$ represents hydroxy or an acyloxy or an alkoxy group and $R'_{17}$ represents a hydrogen atom, a methyl or an ethyl group, is subjected to catalytic hydrogenation of the 6-methylene group, or (b) a compound of the formula

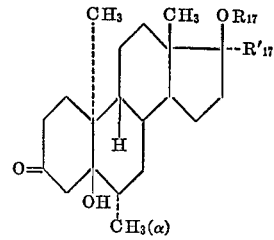

(Formula II)

in which formula $OR_{17}$ represents a hydroxy group or an acyloxy group or an alkoxy group and $R'_{17}$ represents a hydrogen atom, a methyl or an ethyl group, is subjected to dehydration by splitting off of the 5β-hydroxy group to introduce a 4-dehydro bond, or (c) a compound of the formula

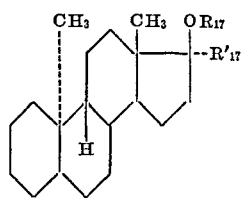

(Formula III)

in which formula $OR_{17}$ represents a hydroxy group or an acyloxy group or an alkoxy group and $R'_{17}$ represents a hydrogen atom, a methyl or an ethyl group and whereby at the carbon atoms 3, 5 and 6 a combination of substituents is present selected from the group consisting of 3-keto, 5βOH, 6αOH, 6βCH₃ and ketalised 3-keto, 5βOH, 6αOH, 6βCH₃, is subjected to dehydration by splitting off the hydroxy groups at carbon atoms 5 and 6, followed by hydrolysis of the ketalised 3-keto group, if present, or (d) a compound of the formula

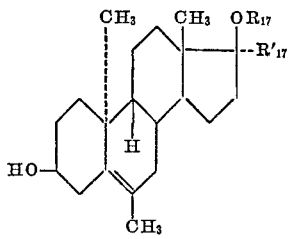

(Formula IV)

in which formula $OR_{17}$ represents a hydroxy, an acyloxy or an alkoxy group and $R'_{17}$ represents a hydrogen atom, a methyl, an ethyl, a vinyl or an ethynyl group, is subjected to an Oppenauer-oxidation to convert the 3-hydroxy-5-dehydro-system into a 3-keto-4-dehydro-system, or (e) a compound of the formula

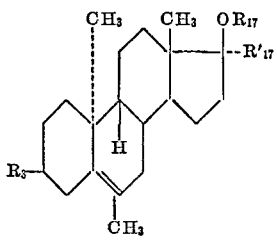

(Formula V)

in which formula $R_3$ represents a keto oxygen atom or a ketalised keto oxygen atom, $OR_{17}$ represents a hydroxy group or an acyloxy group or an alkoxy group and $R'_{17}$ represents a hydrogen atom, a methyl or an ethyl group, is subjected to a reaction to shift the 5,6-double bond to the 4,5-position and converting the ketalised 3-keto group, if present, to a 3-keto-oxygen atom, or (f) a compound of the formula

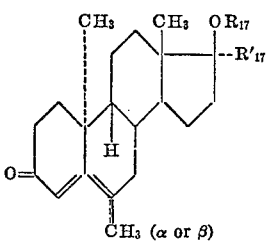

(Formula VI)

in which formula $OR_{17}$ represents a hydroxy group or an acyloxy group or an alkoxy group and $R'_{17}$ represents a hydrogen atom, a methyl or an ethyl group, is subjected to direct 6-dehydrogenation, or (g) a compound of the formula

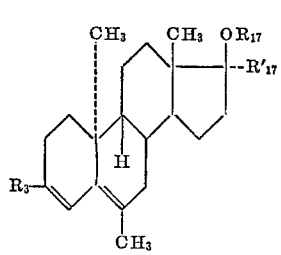

(Formula VII)

in which formula $R_3$ represents an alkoxy group containing from 1–6 carbon atoms or an acyloxy group, $OR_{17}$ represents a hydroxy group, an alkoxy group or an acyloxy group and $R'_{17}$ represents a hydrogen atom or a methyl or an ethyl group, is subjected to oxidation by means of e.g. manganese dioxide or 2,3-dichloro-5,6-dicyano-benzoquinone to produce a corresponding 3-keto-4,6-bisdehydro-6-methyl-9β,10α-steroid, or (h) a compound of the formula

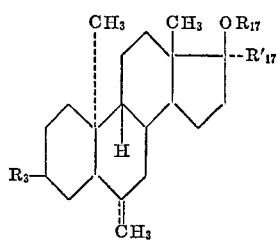

(Formula VIII)

in which formula $R_3$ represents a 3-keto-4-dehydro or 3-keto-4,6-bisdehydro-system, $OR_{17}$ represents a hydroxy, an acyloxy or an alkoxy group and $R'_{17}$ represents a hydrogen atom, a methyl, an ethyl, a vinyl or an ethynyl group, is subjected to 1-dehydrogenation, (i) a compound of the formula

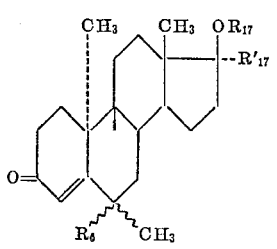

(Formula IX)

in which formula $OR_{17}$ represents a hydroxy group, an acyloxy group or an alkoxy group, $R'_{17}$ represents a hydrogen atom a methyl or an ethyl group and $R_6$ represents a hydroxy group or a chlorine or bromine atom, is subjected to splitting off the 6-hydroxy group or 6-Cl or 6-Br atom, or (j) a compound of the formula

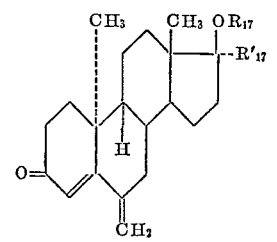

(Formula X)

in which formula $OR_{17}$ represents a hydroxy group, an acyloxy or alkoxy group and $R'_{17}$ represents a hydrogen atom, a methyl or an ethyl group, is subjected to isomerisation using Pd as a catalyst to shift the exocyclic double bond into 6,7-position, or (k) a compound of the formula

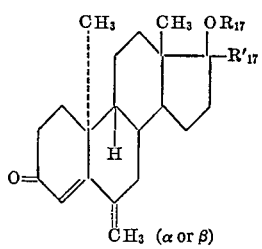

(Formula XI)

in which formula OR$_{17}$ represents a hydroxy group or an acyloxy group or an alkoxy group and R'$_{17}$ represents a hydrogen atom, a methyl or an ethyl group, is subjected to enol-acylation or enol-alkylation to convert the 3-keto-4-dehydro group to a 3-acyloxy-3,5-bisdehydro or a 3-alkoxy-3,5-bisdehydro-system, or (l) a compound of the formula

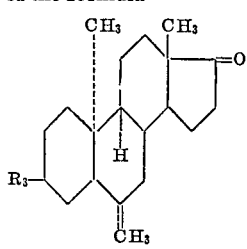

(Formula XII)

in which formula R$_3$ represents a 3-keto-4-dehydro, a 3-keto-4,6-bisdehydro or a protected 3-keto-4-dehydro or a protected 3-keto-4,6-bisdehydro-system, and in which formula the 6-CH$_3$ group may be in α- or β-position when a hydrogen atom is attached to carbon atom 6, is subjected to reduction to convert the 17-keto oxygen into a 17 β-hydroxy group, followed by converting any protected group, if present, into a 3-keto-4-dehydro or 3-keto-4,6-bisdehydro-system, or reoxidation of the allylic hydroxy group, if formed, to a 3-keto group, or, (m) a compound of the formula

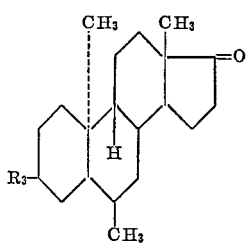

(Formula XIII)

in which formula R$_3$ represents a protected 3-keto-4-dehydro or 3-keto-4,6-bisdehydro-system, is subjected to a reaction with a methyl or ethyl Grignard compound or with lithium methyl or -ethyl followed by hydrolysis of the intermediately formed metal compound to produce a compound having at carbon atom 17 a hydroxy group and a methyl or ethyl group, followed by converting a protected 3-keto-4-dehydro or 3-keto-4,6-bisdehydro-system into a 3-keto-4-dehydro respectively 3-keto-4,6-bisdehydro-system, if necessary, or (n) a compound of the formula

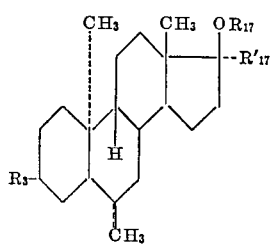

(Formula XIV)

in which formula R$_3$ represents a 3-keto-4-dehydro, 3-keto-4,6-bisdehydro, 3-keto-1,4-bisdehydro, 3-keto-1,4,6-trisdehydro, 3-alkoxy-3,5-bisdehydro or 3-acyloxy-3,5-bisdehydro-system, OR$_{17}$ represents a hydroxy, acyloxy or alkoxy group, R'$_{17}$ represents a vinyl or ethynyl group, is subjected to catalytic hydrogenation, or (o) a compound of the formula

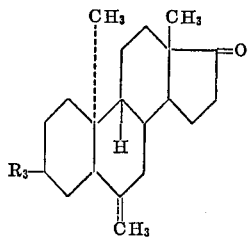

(Formula XV)

in which formula R$_3$ represents a 3-keto-4-dehydro, a 3-keto-4,6-bisdehydro, a 3-keto-1,4,6-trisdehydro, a 3-keto-1,4-bisdehydro, a protected 3-keto-4-dehydro or a protected 3-keto-4,6-bisdehydro-system, is reacted with an alkali metal compound of ethylene or ethene, followed by hydrolysis of the intermediately formed product to produce a compound having at carbon atom 17 a hydroxy group and a vinyl or an ethynyl group and, if desired, followed by hydrolysis of any protected 3-keto-4-dehydro or 3-keto-4,6-bisdehydro-group, if present, or (p) a compound of the formula

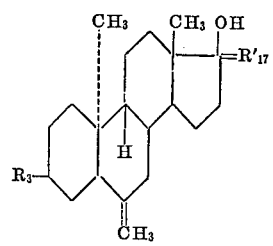

(Formula XVI)

in which formula R$_3$ represents a 3-keto-4-dehydro, a 3-keto-1,4-bisdehydro, a 3-keto-4,6-bisdehydro, a 3-keto-1,4,6-trisdehydro, a 3-alkoxy-3,5-bisdehydro or a 3-acyloxy-3,5-bisdehydro-system and R'$_{17}$ represents a hydrogen atom, a methyl or an ethyl group, and in which formula the 6-CH$_3$ group may be in α- or β-position when a hydrogen atom is attached to carbon atom 6, is subjected to acylation or alkoxylation to convert the 17-hydroxy group to a 17-acyloxy or to a 17-alkoxy group respectively, or (q) a compound of the formula

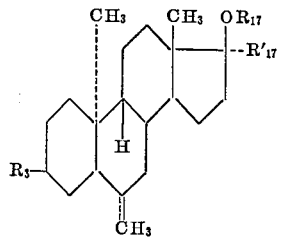

(Formula XVII)

in which formula R$_3$ represents a 3-keto-4-dehydro, a 3-keto-1,4-bisdehydro, a 3-keto-4,6-bisdehydro, a 3-keto-1,4,6-trisdehydro, a 3-alkoxy-3,5-bisdehydro or a 3-acyloxy-3,5-bisdehydro-system and OR$_{17}$ represents a hydroxy group or an acyloxy group or an alkoxy group, R'$_{17}$ represents a hydrogen atom, a methyl or an ethyl group, provided always that at least one of the groups R$_3$ and OR$_{17}$ is an acyloxy or an alkoxy group and in which formula the 6-CH$_3$ group may be in α- or in β-position when a hydrogen atom is attached to carbon atom 6, is subjected to hydrolysis to split off an acyloxy group or an alkoxy group from at least one of the groups R$_3$ and OR$_{17}$, or (r) a compound of the formula

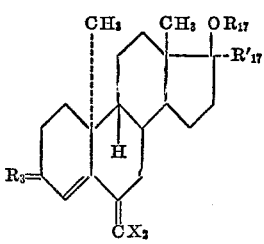

(Formula XVIII)

in which formula X represents a chloro or a bromo atom, $OR_{17}$ represents hydroxy or an acyloxy group or an alkoxy group and $R'_{17}$ represents a hydrogen atom, a methyl, vinyl or ethynyl group, is subjected to catalytic hydrogenation, or (s) a compound of the formula

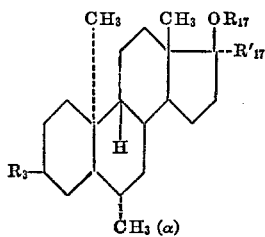

(Formula XIX)

in which formula $R_3$ represents a 3-keto-4-dehydro or a 3-keto-1,4-bisdehydro-system, $OR_{17}$ represents a hydroxy, alkoxy or acyloxy group and $R'_{17}$ represents a hydrogen atom, a methyl, an ethyl, a vinyl or an ethynyl group, is subjected to isomerisation under waterfree acidic conditions to produce the corresponding 6β-methyl compound.

The above identified reactions (a)–(s) may be elucidated as follows. (The paragraphs (a) to (s) inclusively refer to the hereabove indicated reactions (a) to (s) respectively.)

(ad a) The compounds of Formula I may be prepared for example by the so-called "Vilsmeyer" reaction.

According to the Vilsmeyer reaction a 3-alkoxy-3,5-diene-9β,10α-steroid is reacted with dimethylformamide and phosgene. After hydrolysis of an intermediately produced iminium compound the corresponding 6-formyl-3-alkoxy-3,5-diene is produced.

By catalytic reduction or by reduction with sodium- or lithium borohydride the corresponding 6-hydroxymethyl-3-alkoxy-3,5-diene is obtained. Subsequent treatment of the latter compound with aqueous diluted acid results into hydrolysis of the enolether group and simultaneously of dehydration of the 6-hydroxymethyl group. Preferably the reaction is carried out in a medium of aqueous diluted acetic acid or hydrochloric or sulphuric acid in a medium of a lower alkanol, e.g. methanol.

(ad b) A compound of Formula II may be prepared by epoxidising a 3-acyloxy-5-dehydro-9β,10α-steroid, a 3-hydroxy-5-dehydro-9β,10α-steroid or a 3-cycloethylene dioxy-5-dehydro-9β,10α-steroid and reacting the resulting 5β,6β-oxido steroid with methyl magnesium halogenide. The crude grignard reaction product can be directly converted into a compound of the Formula II, for example by oxidation with potassium bichromate in acetic acid. The dehydration reaction according to this part of the invention may be carried out with thionylchloride, p-toluene sulphonic acid, in a suitable solvent (Graber, J. Org. Chem., 27, 2534 (1962)).

(ad c) Compounds of the Formula III containing a ketalised 3-keto group may be produced by epoxidising a ketalised 3-keto-5-dehydro-9β,10α-steroid followed by hydrolysis to produce a compound containing the system

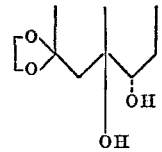

oxidising the latter type of compounds to produce a corresponding 6-keto compound and subjecting the latter compound to a Grignard reaction with a methyl magnesium halide. Compounds of the Formula III containing a 3-keto, 5β OH, 6α OH, 6β $CH_3$-system may be prepared in the following way.

A 3-acetoxy-5-dehydro-9β,10α-steroid is reacted with a peracid, followed by perchloric acid catalysed opening of the epoxide thus produced to give a 3-acetoxy-5β-6α-diol. Subsequent oxidation with sodium dichromate in acetic acid of the triolmonoacetate gives the corresponding 6-keto compound.

The corresponding 3,5β,6α-trihydroxy-6β-methyl-9β,10α-steroid originates upon reaction with an excess of methyl magnesium halide and after hydrolysis according to the Grignard method. The compound thus produced gives upon oxidation the corresponding 3-oxo compound.

(ad d) Compounds of the Formula IV may be prepared by applying "the oxo" reaction to 3-acetoxy-5-dehydro-9β,10α-steroids. According to this reaction a 3-acetoxy-5-dehydro-9β,10α-steroid is reacted with carbon monoxide and hydrogen in the presence of cobalt carbonyl. This leads to a 6β-hydroxymethyl-5β(H)-9β,10α-steroid. Subsequently the latter compound is converted into the corresponding 6β-iodo-methyl-5β-H-9β,10α-steroid, to the corresponding 6β-dimethyl - amino - methyl, the corresponding 6β-dimethyl-amino-methyl-N-oxide and finally into the desired 6-methylene compound. This compound may be converted by isomerisation and hydrolysis into the corresponding 3-hydroxy-5-dehydro-6-methyl compound.

(ad e) The reaction described under (e) represents a slight modification in the starting materials of the reaction described under (d). These starting materials of the Formula V may be prepared according to the "oxo" method described under (d) above, however, applied to a ketalised 3-keto-5-dehydro-9β,10α-steroid instead of to a corresponding 3-acetoxy compound.

(ad f) Direct introduction of a 6-dehydro bond can conveniently be carried out with chlorinated benzoquinones e.g. chloranil or 2,3-dichloro-5,6-dicyanobenzoquinone (D.D.Q.) in the presence of hydrogen chloride, if necessary in an inert solvent.

(ad g, h, i) The reactions described in these parts all relate to introduction of a 6-dehydro bond and may be considered as indirect 6-dehydrogenation reactions.

(ad g) Compounds of the Formula VII may be prepared by enolalkylating or enolacylating a 3-keto-4-dehydro - 6-methyl-9β-10α-steroid, e.g. with alkylorthoformate in dioxan or benzene containing p-toluene sulphonic acid as a catalyst, or with isopropenyl-acetate as described under (k) below.

(ad h) Introduction of a double bond at carbon atom 1 may be carried out by dehydrogenation with selenium dioxide, with 2,3-dichloro-5,6-dicyanobenzoquinone in a medium of dioxan, containing, if desired, a trace of hydrochloric acid (about 1% weight/volume).

(ad i) The starting materials of this reaction may be prepared by reacting a 3-keto-4-dehydro-6-methyl-9β,10α-steroid with an enolacylating agent to produce the corresponding 3,5-dien-3-acyloxy-compound and reacting this compound either with suitable halogenating agents e.g. chlorine, bromine or chloro- or bromo-succinimide or with a peracid. Splitting off of the halogeno atom or the hydroxy group from carbon atom 6 may be carried out respectively with a dehydrohalogenating agent such as tertiary amines (pyridine, collidine, dimethyl aniline) or with a dehydrating agent such as thionylchloride or p-toluene sulphonic acid.

(ad j) The starting materials of this reaction may be prepared as described under (a) above.

(ad k) Suitable enolacylation of the 3-keto-4-dehydro system may be carried out with isopropenylacetate in benzene in the presence of p-toluene sulphonic acid or sulphuric acid as a catalyst or with acetic acid anhydride in the presence of p-toluene sulphonic acid.

Formation of a 3-alkoxy-3,5-dehydro-system may take place by reacting the 3-keto-4-dehydro compound with alkylorthoformate in dioxan or benzene containing p-toluene sulphonic acid as a catalyst.

(ad l) Here and in the following paragraphs the expression "a protected 3-keto-4-dehydro" or "a protected 3-keto-4,6-bisdehydro-system" means a 3-acyloxy-2,4,6-trisdehydro, 3-alkoxy-3,5-bisdehydro, 3-alkoxy-3,5,7-trisdehydro, 3 - acyloxy-3,5-bisdehydro, 3-acyloxy-3,5,7-trisdehydro, 3-enamino-3,5-bisdehydro, 3,7-dipyrrolidino-3,5-bisdehydro or a 3-ketalised 3-keto-4-dehydro or 3-keto-4,6-bisdehydro-system. These systems may easily be introduced by reacting a 3-keto-4-dehydro- or 3-keto-4,6-bisdehydro-9$\beta$,10$\alpha$-steroid with an enolacylating, enolalkylating, enaminating or ketalising compound.

After termination of the main reaction these systems may be easily converted into the 3-keto-4-dehydro or 3-keto-4,6-bisdehydro-systems by a hydrolysis reaction, if desired. At several places in the description the expressions "alkoxy," "acyloxy," "ketalised" and "enamino" are used. These expressions have the following meaning:

Alkoxy.—Alkoxy group containing 1–10 carbon atoms. The alkyl part of the alkoxy group is preferably an aliphatic, alicyclic, mixed aliphatic-aromatic or mixed aliphatic-alicyclic group. Examples of alkoxy are: methoxy-, ethoxy-, propoxy-, tert·butoxy-, cyclopentyloxy-, cyclohexyloxy and benzyloxy, methylcyclopentyloxy;

Acyloxy.—Acyloxy group containing from 1–20 carbon atoms. The acyl part of the acyloxy group is preferably the acyl group of saturated or unsaturated aliphatic mono-, di- or tricarboxylic acid, mixed aliphatic-aromatic carboxylic acid, aromatic carboxylic acid, saturated or unsaturated or alicyclic- or mixed aliphatic-alicyclic monocarboxylic acid, especially those having from 1–6 carbon atoms. Examples of acyloxy groups are: formoxy-, acetoxy-, propionoxy-, butyroxy-, acyloxy groups of oleic acid, palmitic acid, stearic acid, enanthocic acid, undecyloic acid, caproic acid, pivalic acid, succinic acid, malonic acid, citric acid, benzoic acid and p-hexyloxy-phenyl propionic acid, hexahydrobenzoic acid, phenylacetic acid, $\beta$-cyclopentylpropionic acid, $\beta$-cyclohexylpropionic acid;

Enamino.—Is an amino group bound to a carbon atom of an unsaturated carbon double bond. The amino group is substituted with two aliphatic groups each having from 2–6 carbon atoms. The aliphatic groups may form, together with the nitrogen atom a heterocyclic ring, e.g. a pyrrolidino or a piperidino group;

Ketalised.—Ketalised refers to a $>C=O$ group which reacted with an aliphatic diol e.g. ethylenediol or with two molecules of aliphatic alcohol containing from 1–6 carbon atoms e.g. methanol, ethanol.

(ad 1) Reduction of a 17-keto group may be carried out by hydrogenation with Raney nickel, with lithium aluminum hydride sodium borohydride, tri(t·butoxy) aluminum hydride. Reoxidation of any 3-hydroxy group present after the reaction may be carried out with manganese dioxide or with 2,3-dichloro-5,6-dicyanobenzoquinone.

(ad m) The reaction is of the Grignard type and any well-known method may be used. The starting materials may be prepared by oxidising a suitable 17$\beta$-hydroxy-6-methyl-$\beta$, 10$\alpha$-steroid e.g. with MnO$_2$, or according to the Oppenauer method. These latter compounds may be prepared by introducing a 6-methyl group into a 17-hydroxy-9$\beta$,10$\alpha$-steroid according to any one of the methods described in this application.

(ad n) The starting materials of this reaction may be prepared according to the method of step (o). The catalytic hydrogenation itself can be carried out e.g. with hydrogen and a Pt or Pd catalyst.

(ad o) The starting materials of this reaction may be produced by introducing a 6-methyl group into a 17-keto - 3 - keto - 4(6) - (bis) - dehydro - 9$\beta$,10$\alpha$ - steroid according to any one of the methods hereinbefore described.

The reaction of step (o) is preferably carried out with lithium, sodium- or potassium-ethynilide. The reaction may be carried out by dissolving the alkali metal in liquid ammonia, passing the unsaturated compound through the mixture and by adding to this solution, which may contain an aliphatic ether, for instance, diethylether or tetrahydrofuran, a solution of a compound of the Formula XV.

(ad p) Acylation can be carried out with acid chloride e.g. acetylchloride, and pyridine or with an acid e.g. acetic anhydride and trifluoro acetic acid anhydride.

Alkylation can be carried out with alkylhalide e.g. ethylbromide or ethyliodide and silver carbonate or with dihydropyrane in the presence of p-toluene sulphonic acid.

(ad q) Hydrolysis of an acyloxy group may be carried out under weakly alkaline or acidic conditions. Hydrolysis of an alkoxy group should take place under weakly acidic conditions.

(ad r) Catalytic hydrogenation of compounds of the Formula XVIII is preferably carried out with hydrogen in the presence of a Pd catalyst on strontium carbonate. Compounds of the Formula XVIII may be prepared by reacting an enolether of a 3-keto-4-dehydro steroid with tetra-halomethane e.g. with trichloromono-bromomethane or with tetra-bromo-methane and splitting off hydrogen chloride or hydrogen bromide respectively from the 3-keto - 4 - dehydro - 6 - trichloro (or tribromo) - methyl-steroid (Lissberg, Tetrahedron 9, 149 (1960)). The latter part of the reaction is preferably carried out with a basic anion exchanger of the type "Dowex-1" or with alkali alkoxide in alkanol, e.g. with sodium methoxide in boiling methanol.

(ad s) This reaction proceeds smoothly to the desired result by dissolving the compound in a waterfree medium and introducing into the solution gaseous hydrogen chloride.

According to another method a 3-keto-4-dehydro-6$\beta$-trichloro - (6$\beta$ - tribromo) - methyl - 9$\beta$,10$\alpha$ - steroid is reacted with chromous chloride in the presence of hydrochloric acid. A suitable medium consists of a mixture of ethanol and tetrahydrofuran. This reaction proceeds in excellent yields of 3-keto-4-dehydro-6-methylene-9$\beta$,10$\alpha$-steroids.

Compounds of the Formula A have interesting hormonal and anti-hormonal activities. In general the compounds show anabolic or gonadotrophic influencing activities.

Thus 6$\alpha$ - methyl - 17$\beta$ - hydroxy - 9$\beta$,10$\alpha$ - androst-4-en-3-one 17-acetate shows a favourable anabolic activity. The compound is also anti-catabolic. 6$\beta$-methyl-17$\beta$-hydroxy-9$\beta$,10$\alpha$-androst-4-en-3-one 17 acetate is gonadotrophic inhibiting and anti-androgenic.

6 - methyl - 17$\beta$ - hydroxy - 9$\beta$,10$\alpha$ - androsta - 4,6-dien-3-one 17-acetate has a favourable anabolic activity.

The following compounds according to the invention may be produced according to the details as given:

(a) 6$\beta$,17$\alpha$ - dimethyl - 17$\beta$ - hydroxy - 9$\beta$,10$\alpha$ - androst-4-en-3-one from the corresponding 17-oxo-9$\beta$,10$\alpha$-steroid with methyl-magnesium bromide, (b) 6,17$\alpha$ - dimethyl - 17$\beta$ - hydroxy - 9$\beta$,10$\alpha$ - androsta-4,6-dien-3-one by subjecting 6-methyl-9$\beta$,10$\alpha$-androst - 4 - ene - 3,17 - dione to 6 - dehydrogenation followed by a reaction with methyl magnesium bromide.

(c) 6 - methyl - 17$\alpha$ - ethynyl - 17$\beta$ - hydroxy - 9$\beta$,10$\alpha$-androsta - 4,6 - dien - 3 - one from 6 - methyl - 9$\beta$,10$\alpha$- androsta-4,6-dien-3,17-dione by a reaction with lithium ethynylide.

(d) 6 - methyl - 17α - vinyl - 17β - hydroxy - 9β,10α-androsta-4,6-dien-3-one from the corresponding 17α-ethynyl compound as indicated (sub c) by hydrogenation, (e) 6 - methyl - 17α - ethyl - 17β - hydroxy - 9β,10α-androsta - 4,6 - dien - 3 - one from 6 - methyl - 9β,10α-androsta-4,6-dien-3,17-dione by reaction with ethyl magnesium bromide, (f) 6α - methyl - 17α - ethyl - 17β - hydroxy - 9β,10α-androst - 4 - en - 3 - one from 6α - methyl - 9β,10α-androst-4-ene-3,17-dione by reaction with ethylmagnesium bromide, (g) 6α - methyl - 17β - hydroxy - 9β,10α - androst-4-en-3-one 17-decanoate by esterifying the corresponding free 17-hydroxy compound with the acid chloride of decanoic acid, (h) 6α - methyl - 17β - hydroxy - 9β,10α - androst-4 - en - 3 - one 17 - cyclopentylpropionate by esterifying the corresponding free 17-hydroxy compound with the acid chloride of cyclopentyl propionic acid.

The conditions of the reactions schematically given hereabove will be clear from the details given elsewhere in the specification or from the art well-known to the expert. In particular it should be pointed out that reactions with a methyl- or ethylmagnesium bromide or with lithium ethynylide generally required protection of a 3-keto group, if present. Other compounds according to the invention will be clear from the Examples.

In particular compounds of the Formula XVIII, including those compounds having also a 1,2-dehydro bond, are suitable starting materials for producing the compounds according to the invention. As such may be mentioned in particular:

6-dichloromethylene-17β-hydroxy-9β,10α-androsta-1,4-dien-3-one;
6-dibromomethylene-17β-hydroxy-9β,10α-androsta-1,4-dien-3-one;
6-dichloromethylene-17β-hydroxy-17-ethyl-9β,10α-androsta-1,4-dien-3-one 17-acetate;
6-dibromomethylene-17β-hydroxy-17-methyl-9β,10α-androsta-1,4-dien-3-one;
6-dichloromethylene-17β-hydroxy-17-methyl-9β,10α-androst-4-en-3-one 17-acetate;
6-dibromomethylene-17β-hydroxy-17-ethyl-9β,10α-androst-4-en-3-one;

The compounds according to the invention may be worked up to pharmaceutical preparations in the usual manner.

Thus they may be compounded to tablets for oral take-up by mixing the compounds with inert carrier materials such as potato starch, lactose, together with fillers and/or binders or solid lubricants e.g. magnesium stearate, a carboxymethyl cellulose. Injection liquids can be produced by dissolving a methylene chloride solution of an active compound in arachid oil and by subsequent evaporation of methylene chloride, while working under sterile conditions or by any other suitable method e.g. the one as described in the Examples.

PREPARATIONS OF INTERMEDIATES AND STARTING MATERIALS (A) 6β-tribromomethyl-17β-hydroxy-9β,10α-androst-4-en-3-one 17-acetate To a solution of 6 g. of 17β-hydroxy-9β,10α-androst-4-en-3-one 17-acetate in 75 ml. of dry, freshly distilled dioxan, 4.1 ml. of ethyl orthoformate and 100 mg. of p-toluenesulfonic were added. The mixture was allowed to stand in a well-closed vessel at room temperature for 48 hours, in which time the enoletherification was mostly completed. The conversion into the 3-enol-ether was checked by means of thin-layer chromatography (benzene + 2% of acetone + ~0.1% of pyridine). In the case the conversion was not nearly complete, the mixture was after the addition of 1.5 ml. of ethyl orthoformate, kept at room temperature for an additional period of 24 hours. To the solution were then added 2.9 ml. of pyridine and 18.1 g. of tetrabromomethane. The mixture was allowed to stand in diffuse daylight at room temperature for 10 days. The crystalline precipitate was filtered off and the filtrate was after dilution with methylene chloride, washed with water, 2 N sulfuric acid, water, 5%, sodium bicarbonate solution and finally with water. After drying and evaporation of the solvents, the residue was triturated with ether, to give 7.2 g. of 6β-tribromomethyl-17β-hydroxy-9β,10α-androst-4-en-3-one 17 acetate. An analytical sample was obtained by chromatography on silicagel (elution with methylene chloride) M.P. 180° (Kofler); $[\alpha]_D^{25} = -68.5°$; ε 240 nm.=13,700; I.R. 725, 742, 871, 877, 1031, 1048, 1253, 1374, 1612, 1674 and 1730 cm.$^{-1}$; N.M.R. 0.87/s.(3) CH$_3$-18; 1.38/s.(3) CH$_3$-19; 2.03/s.(3) CH$_3$—Ac; 3.36/dm./J=11 c./s.(1) CH-6; 4.70/m.(1) CH-17; 5.27/s. CH$_2$Cl$_2$;

6.38/d./J=1 c./s./(1) CH-4.

(B) 6β-trichloromethyl-17β-hydroxy-9β,10α-androst-4-en-3-one 17 acetate

This compound was prepared from 17β-hydroxy-9β,10α-androst-4-en-3-one 17-acetate according to the same method as preparation A. However tetrabromomethane was replaced by tetrachloromethane. Yield 65%; M.P. 177.5–178°; $[\alpha]_D^{25} = -97.5°$; ε 238 nm.=14,300; I.R. 780, 865, 882, 1027, 1046, 1242, 1610, 1685 and 1745 cm.$^{-1}$; N.M.R. 0.88/s.(3) CH$_3$-18; 1.39/s.(3) CH$_3$-19; 205/s(3) CH$_3$—Ac; 337/dm./J=12 c./s.(1) CH-6; 4.72/m.(1) CH-17; 6.31/d./J=1 c./s.(1) CH-4.

(C) 6β-trichloromethyl-9β,10α-pregn-4-ene-3,20-dione

From 9β,10α-pregn-4-ene-3,20-dione in the same manner as described in Preparations A and B, yield 50%; M.P. 205.5–206.5°; $[\alpha]_D^{25} = -37.5°$; ε 238 nm.=13,900; I.R. 776, 787, 868, 878, 1363, 1617, 1679 and 1701 cm.$^{-1}$.

(D) 6-dibromomethylene-17β-hydroxy-9β,10α-androst-4-en-3-one 17-acetate

To a solution of 10 g. of 6β-tribromomenthyl-17β-hydroxy-9β,10α - androst-4-en-3-one 17-acetate as described in Preparation A in 300 ml. of methylene chloride, a solution of 2 g. of sodium hydroxide in 1000 ml. of methanol was added and the mixture was refluxed for 2.5 hours. After neutralization with acetic acid, the solvent was evaporated in vacuo and the residue taken up in a mixture of 100 ml. of pyridine and 18.5 ml. of acetic anhydride. The acetylation mixture was allowed to remain at room temperature for 16 hours, after which time the mixture was poured into cold water. The methylene chloride extract was washed with water, N sulfuric acid, water, a sodium bicarbonate solution and finally with water. The dried solution was evaporated and the residue crystallized from acetone to give 7.7 g. of 6-dibromomethylene-17β-hydroxy-9β,10α-androst - 4 - en-3-one 17-acetate with M.P. 188–189°. An analytically pure sample melted at 190–191°; $[\alpha]_D^{25} = -204°$; ε 250 nm.=9,700, ε 285 nm.=5,850; I.R. 688, 805, 823, 883, 1028, 1050, 1245, 1380, 1580, 1620, 1680 and 1740 cm.$^{-1}$.

(E) 6-dichloromethylene-17β-hydroxy-9β,10α-androst-4-en-3-one 17-acetate

This compound was prepared from 6β-trichloromethyl-17β-hydroxy-9β,10α-androst-4-en-3-one 17-acetate as described in Preparation B in the same way as described in Preparation C. Yield 85%; M.P. of an analytical sample 213.5–214.5°; $[\alpha]_D^{25} = -258°$; ε241.5 nm.=9,500, ε271 nm.=6,800; I.R. 692, 882, 898, 1030, 1049, 1245, 1607, 1617, 1685 and 1735 cm.$^{-1}$. N.M.R. 0.85/s.(3) CH$_3$-18; 130/s.(3) CH$_3$-19; 2.10/s.(3) CH$_3$—Ac; 4.67/m.(1) CH-17; 5.84/s.(1) CH-4.

Dehydrohalogenation of the 6β-trichloro- and of the 6β-tribromo-compound with alkali gave the corresponding 6-dihalomethylene compounds with yields of 90–95%.

(F) 6-dibromomethylene-17β-hydroxy-9β,10α-androst-4-en-3-one

This compound was produced when splitting off hydrogen halide from 6β-tribromomethyl-17β-hydroxy-9β,10α-androst-4-en-3-one 17-acetate according to the first part of Preparation C. Simultaneously with dehydrohalogenation saponification of the 17-acetoxy group takes place.

M.P. 248.5–249.5° (dec.); $[\alpha]_D^{25}=-218°$; $\epsilon 250$ nm.= 9,800, $\epsilon 284$ nm.=5,700; I.R. 691, 802, 881, 1017, 1071, 1090, 1570, 1580, 1604, 1655 and 3445 cm.$^{-1}$.

(G) 6-dichloromethylene-17β-hydroxy-9β,10α-androst-4-en-3-one

This compound was produced when splitting off hydrogen halide from 6β-trichloromethyl-17β-hydroxy-9β,10α-androst-4-en-3-one 17-acetate according to the method described in the first Preparation C. Simultaneously with dehydro-halogenation saponification of the 17-acetoxy group takes place.

M.P. 226–227.5°; $[\alpha]_D^{25}=-271°$; $\epsilon 242.5$ nm.=9,400, $\epsilon 270$ nm.=6,700; I.R. 696, 880, 895, 1073, 1092, 1610, 1620, 1675 and 3440 cm.$^{-1}$.

(H) 6-dibromomethyl-17β-hydroxy-9β,10α-androsta-4,6-dien-3-one

This compound was produced as a side product of the process described in Preparation G.

M.P. 209–209.5°; $[\alpha]_D^{25}=-334°$; $\epsilon 258.5$ nm.=9,500, $\epsilon 292$ nm.=7,500.

I.R. 685, 805, 898, 935, 940, 1061, 1087, 1605, 1625 and 1665 cm.$^{-1}$.

(J) 6β-trichloromethyl-17β-hydroxy-17-methyl-9β,10α-androst-4-en-3-one 17-acetate 17β-hydroxy-9β,10α-androst-4-en-3-one was converted into a corresponding 3-enamino-3,5-bisdehydro-9β,10α-steroid. This compound was oxidized to produce 3-enamino 9β,10α-androsta-3,5-dien-17-one which latter compound was reacted with methylmagnesiumbromide which reaction after hydrolysis resulted in formation of 17-methyl-17β-hydroxy-9β,10α-androst-4-en-3-one.

This compound was esterified with acetylchloride and some pyridine to produce the corresponding 17-acetate. The 17-acetate was converted into 6β-trichloromethyl-17β-hydroxy-17-methyl-9β,10α-androst-4-en-3-one 17-acetate by the method described in Preparation A using however tetrachloromethane instead of tetrabromomethane.

M.P. 188.5–189.5°; $\epsilon 238.5$ nm.=14,350; $[\alpha]_D^{25}=-99°$. I.R. 657, 683, 780, 879, 1016, 1037, 1268, 1410, 1675 and 1725 cm.$^{-1}$.

N.M.R. 0.95/s.(3) CH$_3$18; 1.40/s.(3) CH$_3$-19; 1.51/s.(3) CH$_3$-17; 198/s.(3) CH$_3$—Ac; 3.37/dm./J=12 c./s.(1) CH-6; 6.31/d./J=1 c./s.(1) CH-4.

(K) 6-dichloromethylene-17β-hydroxy-17-methyl-9β,10α-androst-4-en-3-one

6β - trichloromethyl - 17β - hydroxy - 17 - methyl - 9β, 10α-androst-4-en-3-one as prepared according to Preparation J was subjected to dehydrohalogenation with sodium hydroxide in methanol as described in Preparation C to produce 6-dichloromethylene-17β-hydroxy-17-methyl-9β, 10α-androst-4-en-3-one.

M.P. 175–177°; $\epsilon 253$ nm.=9,700, $\epsilon 268$ nm.=6,700.

EXAMPLES OF COMPOUNDS ACCORDING TO THE INVENTION

Example 1.—6α-methyl-17β-hydroxy-9β,10α-androst-4-en-3-one 17-acetate

A solution of 9 g. of 6-dibromomethylene-17β-hydroxy-9β,10α-androst-4-en-3-one in a mixture of 410 ml. of 2-methoxy ethanol, which was freshly distilled after standing overnight over potassium carbonate, 150 ml. of sulfur-free toluene and 7.4 ml. of triethyl amine was added to a suspension of 12.2 g. of pre-reduced 2% palladium/strontium carbonate-catalyst in 410 ml. of 2-methoxyethanol. Then the mixture was shaken with hydrogen at room temperature. After consumption of 103% (~35 min.) of hydrogen, the uptake practically ceased. After removal of the catalyst, the filtrate was diluted with 1 l. of water and extracted with three portions of 750 ml. of ether. Evaporation of the dried solution gave 5.7 g. of a residue, which was chromatographed on silicagel to yield 3.8 g. of nearly pure 6α-methyl-17β-hydroxy-9β,10α-androst-4-en-3-one (T.L.C.). Recrystallization from acetone afforded an analytical sample with M.P. 154.5–156.5°; $[\alpha]_D^{25}=+29°$; $\epsilon 246$ nm.=14,600; I.R. 868, 1026, 1047, 1250, 1601, 1660 and 1732 cm.$^{-1}$; N.M.R. 0.86/s.(3) CH$_3$-18; 1.18/d./J=6.5 c./s.(3) CH$_3$-6; 1.23/s.(3) CH$_3$-19; 2.03/s.(3) CH$_3$—Ac; 4.68/m.(1) CH-17; 5.87/d./J=1.7 c./s.(1) CH-4. Catalytic hydrogenation of the 6-chloro (or bromo)-methylene-4-en-3-ones gave in approximately 60% yield the corresponding 6α-methyl-4-en-3-ones.

Example 2.—6β-methyl-17β-hydroxy-9β,10α-androst-4-en-3-one 17-acetate

6α - methyl - 17β - hydroxy - 9β,10α - androst - 4 - en-3-one 17-acetate (2.5 g.) was dissolved in 130 ml. of acetic acid. A stream of anhydrous hydrogen chloride was passed through the solution at room temperature for 45 minutes, followed by a stream of nitrogen for 2 hours. Then the mixture was poured into water and the precipitated solid was filtered off and washed thoroughly with water, yielding 2.3 g. of the corresponding 6β compound. The physical constants of analytically pure compound are:

M.P. 179–180°; $[\alpha]_D^{25}=-133°$; $\epsilon 242.5$ nm.=15,000; I.R. 855, 868, 1028, 1047, 1240, 1608, 1665 and 1733 cm.$^{-1}$; N.M.R. 0.85/s.(3) CH$_3$-18; 1.07/d./J=6.5 c./s.(3) CH$_3$-6; 1.33/s.(3) CH$_3$-19; 2.05/s.(3) CH$_3$—Ac; 471/m.(1) CH-17; 5.76/d./J=1.3 c./s.(1) CH-4.

Example 3.—6-methyl-17β-hydroxy-9β,10α-androsta-4,6-dien-3-one 17-acetate

To a stirred solution of 4.5 g. of 6α-methyl-17β-hydroxy-9β,10α-androst-4-en-3-one in 350 ml. of a solution of anhydrous hydrogen chloride in dry dioxan (136 mg. of hydrogen chloride per ml. of solution) a solution of 4.32 g. of D.D.Q., in 100 ml. of the same hydrogen chloride-dioxan solution was added at 8°. After 20 minutes at 8°, the reaction mixture was filtered, poured into 2 l. of N sodium hydroxide and thoroughly extracted with methylene chloride. The extract was washed with water, N sodium hydroxide and water. Evaporation of the solvent gave 4.0 g. of a residue, which was chromatographed on silicagel to yield, after recrystallization from acetone/n-hexane, 2.65 g. of 6-methyl-17β-hydroxy-9β,10α-androsta-4,6-dien-3-one 17-acetate with M.P. 183–186°. An analytically pure sample obtained by recrystallization from ether, melted at 169–170°; $[\alpha]_D^{25}=-546$; $\epsilon 290$ nm.=22,500; I.R. 890, 1025, 1043, 1243, 1580, 1640, 1660 and 1740 cm.$^{-1}$.

Example 4.—6β-methyl-17β-hydroxy-9β,10α-androsta-1,4-dien-3-one 17-acetate

A solution of 2.0 g. of 6β-methyl-17β-hydroxy-9β,10α-androst-4-en-3-one 17-acetate and 2.3 g. of D.D.Q. in 120 ml. of dry dioxan was heated under reflux for 18 hours. On cooling, the precipitated hydroquinone was removed by filtration. The filtrate, after dilution with 300 ml. of benzene was washed with water, N sodium hydroxide and water. After drying the solvent was removed under reduced pressure and the residue (1.7 g.) purified by chromatography on silicagel, followed by recrystallization from methanol, to give 700 mg. of 6β-methyl-17β-hydroxy-9β, 10α-androsta-1,4-dien-3-one 17-acetate.

Example 5.—6α,17α-dimethyl-17-hydroxy-9β,10α-androst-4-en-3-one 6 dichloromethylene - 17β - hydroxy-17-methyl-9β,10α-androst-4-en-3-one as prepared according to Preparation K was subjected to hydrogenation as described in Example 1 to produce 6α,17α-dimethyl-17-hydroxy-9β,10α-androst-4-en-3-one. M.P. 99–102°; $\epsilon$248 nm.=14,800; I.R. 868. 1600, 1650 and 3400 cm.$^{-1}$.

Example 6

6-methyl-17β-hydroxy-9β,10α-androst-4-en-3-one 17-acetate was dissolved in dimethylformamide. This solution was filtrated through a bacterial retentive filter and the sterile filtrate was poured out into sterile distilled water. Micro crystalline particles of the said steroid of a particle size of 1–10/μ orifinated. The crystals were filtered off and dried in vacuo over $P_2O_5$. All manipulations took place under aseptic conditions.

5 g. of the sterile micro crystalline crystals of the said steroid were suspended under aseptic conditions in 200 ml. of a sterile aqueous solution of the following composition:

|  | Mg. |
|---|---|
| Polysorbate 80 U.S.P. | 200 |
| Sodium chloride | 1800 |
| Methylester of p-hydroxy-benzoic acid | 320 |
| Propylester of p-hydroxy-benzoic acid | 80 |
| Sterile distilled water ad | 200 |

Under aseptic conditions sterile ampoules and vials were filled with this sterile suspension after careful homogenisation of the same.

What is claimed is:

1. Compounds of the formula

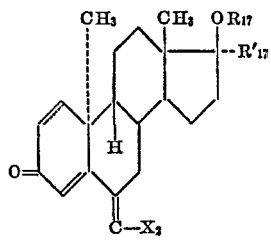

wherein $OR_{17}$ is a member selected from the group consisting of hydroxy, acyloxy of 1 to 20 carbon atoms and $R'_{17}$ is a member selected from the group consisting of hydrogen, methyl, ethyl, vinyl and ethynyl groups and X is a halogen selected from the group consisting of chlorine and bromine and wherein a double bond may be present at carbon atom 1.

2. A compound of claim 1 corresponding to the formula

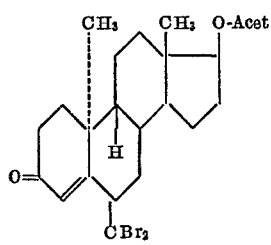

3. A compound of claim 1 corresponding to the formula

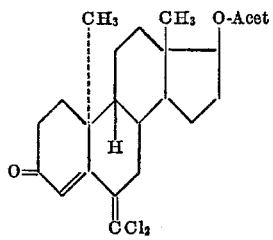

4. A compound of claim 1 corresponding to the formula

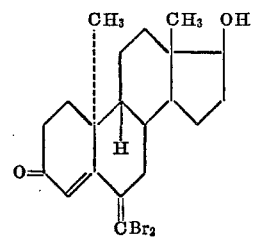

5. A compound of claim 1 corresponding to the formula

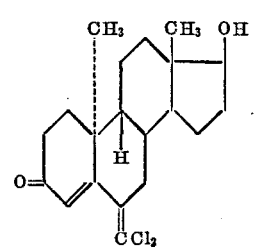

6. A compound of claim 1 corresponding to the formula

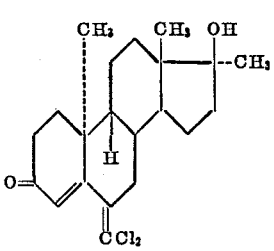

References Cited

UNITED STATES PATENTS

| 3,170,937 | 2/1965 | Petrow | 260—397.45 |
| 3,192,201 | 6/1965 | Westerhof | 260—397.45 |

OTHER REFERENCES

Germany 1,030,338, 5-1958, 260—397.4.

ELBERT L. ROBERTS, *Primary Examiner.*

U.S. Cl. X.R.

260—239.5, 239.55, 397.3

UNITED STATES PATENT OFFICE
CERTIFICATE OF CORRECTION

Patent No. 3,445,489    Dated May 20, 1969

Inventor(s) ENGBERT HARMEN REERINK ET AL

It is certified that error appears in the above-identified patent and that said Letters Patent are hereby corrected as shown below:

Column 9, line 71, "β" should read -- 9β --.
Column 12, line 32, "205" should read -- 2.05 --; "337" should read -- 3.37 --. Column 12, line 74, "130" should read -- 1.30 --. Column 13, line 52, after "1410" insert -- 1610 --. Column 14, line 40, "471" should read -- 4.71 --.

Claim 2, the formula should read:

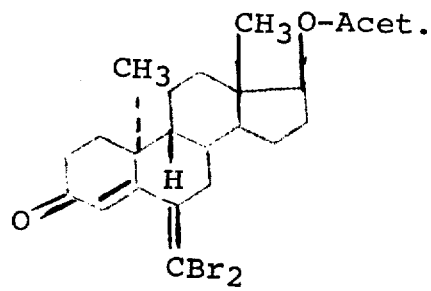

Signed and sealed this 2nd day of June 1970.

(SEAL)
Attest:

Edward M. Fletcher, Jr.
Attesting Officer

WILLIAM E. SCHUYLER, JR.
Commissioner of Patents